United States Patent
Van Phan et al.

(10) Patent No.: US 12,156,065 B2
(45) Date of Patent: Nov. 26, 2024

(54) REDUCING OVERHEAD FOR QoS MONITORING OF V2X SERVICES

(71) Applicant: Nokia Technologies Oy, Espoo (FI)

(72) Inventors: Vinh Van Phan, Oulu (FI); Ling Yu, Kauniainen (FI); Hajo Bakker, Eberdingen (DE); Rudraksh Shrivastava, Erligheim (DE); Oliver Blume, Stuttgart (DE); Jedrzej Stanczak, Wroclaw (PL)

(73) Assignee: Nokia Technologies Oy, Espoo (FI)

( * ) Notice: Subject to any disclaimer, the term of this patent is extended or adjusted under 35 U.S.C. 154(b) by 389 days.

(21) Appl. No.: 17/622,530

(22) PCT Filed: Jun. 28, 2019

(86) PCT No.: PCT/EP2019/067399
§ 371 (c)(1),
(2) Date: Dec. 23, 2021

(87) PCT Pub. No.: WO2020/259849
PCT Pub. Date: Dec. 30, 2020

(65) Prior Publication Data
US 2022/0361028 A1 Nov. 10, 2022

(51) Int. Cl.
*H04W 24/10* (2009.01)
*H04W 4/021* (2018.01)
*H04W 4/44* (2018.01)

(52) U.S. Cl.
CPC .......... *H04W 24/10* (2013.01); *H04W 4/021* (2013.01); *H04W 4/44* (2018.02)

(58) Field of Classification Search
CPC ........ H04W 24/00; H04W 4/44; H04W 4/021
See application file for complete search history.

(56) References Cited

U.S. PATENT DOCUMENTS

2016/0174126 A1* 6/2016 Bontu .................. H04W 24/02
370/332

FOREIGN PATENT DOCUMENTS

| EP | 1619917 A1 | 1/2006 |
|---|---|---|
| WO | 2019/137612 A1 | 7/2019 |

(Continued)

OTHER PUBLICATIONS

"3rd Generation Partnership Project; Technical Specification Group Services and System Aspects; Study on architecture enhancements for the Evolved Packet System (EPS) and the 5G System (5GS) to support advanced V2X services (Release 16)", 3GPP TR 23.786, V16.0.0, Mar. 2019, pp. 1-118.

(Continued)

*Primary Examiner* — Brenda H Pham
(74) *Attorney, Agent, or Firm* — Barta Jones, PLLC (57) ABSTRACT

The present invention provides apparatuses, methods, systems, computer programs, computer program products and computer-readable media for reducing overhead for Quality-of-service (QoS) monitoring of vehicle-to-everything (V2X) services. The method comprises receiving, at a user equipment, from a serving network, a request for a Quality-of-Service (QoS) monitoring session, making a first determination, at the user equipment, whether the user equipment is relevant for the request, based on the content of the request, making a second determination, at the user equipment, if it is determined in the first determination that the user equipment is relevant, whether the request is received in dedicated signaling or common signaling, deciding, at the user equipment, whether or not to initiate the requested QoS monitoring session based on the second determination.

19 Claims, 4 Drawing Sheets

(56) References Cited

FOREIGN PATENT DOCUMENTS

WO    2020/253936 A1    12/2020
WO    2021/037334 A1    3/2021

OTHER PUBLICATIONS

"3rd Generation Partnership Project; Technical Specification Group Services and System Aspects; Study on application layer support for V2X services; (Release 16)", 3GPP TR 23.795, V16.1.0, Dec. 2018, pp. 1-77.
"QoS monitoring and reporting for NR Sidelink V2X Communications", 3GPP TSG-RAN WG2 Meeting #105, R2-1902057, Agenda: 11.4.5, Huawei, Feb. 25-Mar. 1, 2019, pp. 1-3.
International Search Report and Written Opinion received for corresponding Patent Cooperation Treaty Application No. PCT/EP2019/067399, dated Feb. 18, 2020, 12 pages.

* cited by examiner

REDUCING OVERHEAD FOR QoS MONITORING OF V2X SERVICES

RELATED APPLICATION

This application was originally filed as PCT Application No. PCT/EP2019/067399, filed on Jun. 28, 2019, of which is incorporated herein by reference in its entirety.

TECHNICAL FIELD

Various example embodiments relate to apparatuses, methods, systems, computer programs, computer program products and computer-readable media for reducing overhead for Quality-of-Service, QoS, monitoring of Vehicle-to-Everything, V2X, services.

Abbreviations and Definitions

3GPP 3$^{rd}$ Generation Partnership Project
5GS 5G System
AMF Access and Mobility Management Function
CoR Category of Requirements
E2E End to End
IIoT Industrial Internet of Things
KPI Key Performance Indicator
LoA Level of Automation
MBMS Multicast Broadcast Multimedia Service
NR New Radio
PLMN Public Land Mobile Network
SL SideLink
SMF Session Management Function
QoS Quality of Service
UE User Equipment
URLLC Ultra-Reliable Low Latency Communication
V2X Vehicle-to-Everything

BACKGROUND

This invention is targeted for 3GPP NR V2X support in Release 17 and beyond. The invention is related to the following key issues addressed in 3GPP SA2 and SA6, as described in document "3GPP TR 23.786 Study on architecture enhancements for EPS and 5G System to support advanced V2X services":

"5.15 Key Issue #15: Enhancements to assist Application Adjustment 5.15.1 General description Each eV2X service, as defined in TS 22.186 [4], may be provided with different application configurations, such as Levels of Automation, inter-vehicle gap, etc. Each application configuration may have a different QoS requirement. As a consequence, the application may have to adjust its configuration in case of QoS change according to the new QoS that can be delivered.

Considering the requirements of eV2X services, it may be important for some application(s) to be notified about a potential change in the delivered QoS in advance, in order to be able to dynamically adjust its configuration. The notification may consider the locations in which the UE is likely to be driving for a given time period.

This key issue aims at studying 5GS enhancements to assist application adjustments for eV2X services, according to notifications about potential change in the delivered QoS.

This key issue applies only to UEs connected via Uu.

This key issue addresses the following aspects:

what information is required as input to enable the assessment of a potential change in QoS in given areas by the 5GS;

how the 5GS may determine that a notification about potential change in delivered QoS is necessary;

how the 5GS may communicate such information to the application in the AF and/or the UE."

The invention is further related to the following key issues, as described in document "3GPP TR 23.795 Study on application layer support for V2X services":

"5.2 Key issue 2—Monitoring network situation of 3GPP systems by V2X application In a V2X scenario, for a given CoR, the LoA can be adjusted in the range between 1 and 5 and this adjustment in LoA may be a result of a particular network situation (e.g. congestion). The V2X application may monitor the network situation and adapt the LoA for a given CoR corresponding to a V2X scenario. This change in LoA should also be communicated to the V2X UE by the V2X application server.

This aspect where V2X application server is capable to adjust the LoA for single or specified sets of users of the same service (e.g. platooning), by monitoring the network situation (e.g. network load) and communicating the change of LoA with V2X UE over V1 reference point is currently not addressed in 3GPP TS 23.285 [8].

The ability to provide the V2X application with the 3GPP network conditions (e.g. network load) and the aspect of communicating the change of LoA to the V2X UE requires further study."

Currently, there is known a method to enable and facilitate that a UE of URLLC may be informed and reassured of what and how ultra-x requirements, x is at least one of low latency, high reliability and high availability, are supported by a serving ultra-x graded cell beforehand or at least in a proactive manner. This is therefore focusing on RAN level KPIs over Uu and not E2E level KPIs of URLLC. SL is not considered.

Further, a solution for QoS support for eV2X over Uu interface is provided, addressing enhancements for QoS monitoring and control with 2 alternative options:

Option 1—RAN based multi-QoS profile;

Option 2—CN based multi-QoS profile.

However, such QoS monitoring as well as what and how to perform QoS monitoring is not addressed or rather open.

Furthermore, there is known a method for massive QoS monitoring over Uu. The focus is not on the overhead reduction at the first place and the use of SL is not considered.

Moreover, up to now, in LTE V2X, there is no mechanism of QoS monitoring and feedback in sidelink.

SUMMARY

It is an object of various example embodiments to improve the prior art and to provide apparatuses, methods, systems, computer programs, computer program products and computer-readable media for reducing overhead for Quality-of-service, QoS, monitoring of vehicle-to-everything, V2X, services.

According to an aspect of various example embodiments there is provided a method comprising:

receiving, at a user equipment, from a serving network, a request for a Quality-of-Service, QoS, monitoring session;

making a first determination, at the user equipment, whether the user equipment is relevant for the request, based on a content of the request, making a second determination, at the user equipment, if it is determined in the first determination that the user equipment is relevant, whether the request is received in dedicated signaling or common signaling, deciding, at the user equipment, whether or not to initiate the requested QoS monitoring session based on the second determination.

According to another aspect of various example embodiments there is provided an apparatus comprising:

at least one processor, and at least one memory for storing instructions to be executed by the processor, wherein the at least one memory and the instructions are configured to, with the at least one processor, cause the apparatus at least to perform:

receiving, at a user equipment, from a serving network, a request for a Quality-of-Service, QoS, monitoring session;

making a first determination, at the user equipment, whether the user equipment is relevant for the request, based on a content of the request, making a second determination, at the user equipment, if it is determined in the first determination that the user equipment is relevant, whether the request is received in dedicated signaling or common signaling, deciding, at the user equipment, whether or not to initiate the requested QoS monitoring session based on the second determination.

According to an aspect of various example embodiments there is provided an apparatus comprising:

means for receiving, at a user equipment, from a serving network, a request for a Quality-of-Service, QoS, monitoring session;

means for making a first determination, at the user equipment, whether the user equipment is relevant for the request, based on a content of the request, means for making a second determination, at the user equipment, if it is determined in the first determination that the user equipment is relevant, whether the request is received in dedicated signaling or common signaling, means for deciding, at the user equipment, whether or not to initiate the requested QoS monitoring session based on the second determination.

According to another aspect of the present invention there is provided a computer program product comprising code means adapted to produce steps of any of the methods as described above when loaded into the memory of a computer.

According to a still further aspect of the invention there is provided a computer program product as defined above, wherein the computer program product comprises a computer-readable medium on which the software code portions are stored.

According to a still further aspect of the invention there is provided a computer program product as defined above, wherein the program is directly loadable into an internal memory of the processing device.

According to an aspect of various example embodiments there is provided a computer readable medium storing a computer program as set out above.

Further aspects and features of the present invention are set out in the dependent claims.

BRIEF DESCRIPTION OF THE DRAWINGS

These and other objects, features, details and advantages will become more fully apparent from the following detailed description of various aspects/embodiments which is to be taken in conjunction with the appended drawings, in which.

DETAILED DESCRIPTION

The present disclosure is described herein with reference to particular non-limiting examples and to what are presently considered to be conceivable embodiments. A person skilled in the art will appreciate that the present disclosure is by no means limited to these examples and embodiments, and may be more broadly applied.

In the following, some example versions of the disclosure and embodiments are described with reference to the drawings. For illustrating the various embodiments, the examples and embodiments will be described in connection with a cellular communication network based on a 3GPP based communication system, for example, a 5G/NR system or the like. As such, the description of example embodiments given herein specifically refers to terminology which is directly related thereto. Such terminology is only used in the context of the presented non-limiting examples and embodiments, and does naturally not limit the present disclosure in any way. Rather, any other system configuration or deployment may equally be utilized as long as complying with what is described herein and/or example embodiments described herein are applicable to it. Further, it is to be noted that the various embodiments are not limited to an application using such types of communication systems or communication networks, but is also applicable in other types of communication systems or communication networks.

For the key issues listed above there is a need for facilitating on-the-fly (in real time) monitoring of certain network situations or KPIs and, in particular, deliverable QoS level(s) related to some targeted application(s) and service(s) or service class(es) of V2X and the like, such as IIoT. This kind of monitoring is not specific to an individual UE but rather averaged out over a certain service area and a certain time period at the present. This is thus referred to herein as on-the-fly massive QoS monitoring. In certain embodiments, it is thus referred to on-the-fly massive QoS monitoring, however, it is noted that this is merely an example and that the present invention is not limited thereto, and that the invention is applicable to both QoS monitoring and on-the-fly massive QoS monitoring.

It is noted that even though the key issue #15 of 3GPP TR 23.786 is aimed for UE connected via Uu, on-the-fly massive QoS monitoring is important for providing services over SL as well, i.e., in case UE is connected via SL to other UEs as well as distributed servers such as road side units (RSU).

SL is one of the essential means for direct communications between local UEs involved in or impacted by targeted applications and services. SL in LTE is based on broadcast without feedback control on radio-access level (L1/L2). SL in NR is an evolution of SL in LTE, further enhanced to include options with feedback control on radio-access level (L1/L2) for a better support of unicast and groupcast applications and services of V2X with demanding QoS requirements. However, QoS monitoring on SL is not trivial from the serving network perspective, as data transmissions over SL are not routed through the serving network under direct control of the serving network as applied for regular cellular access data traffic over Uu.

One of the main technical issues associated with on-the-fly massive QoS monitoring is high overhead. The worst-case scenario is to get all relevant UEs in all relevant cell(s) covering the targeted service area to perform some measurement and reporting for QoS monitoring. Thus, keeping the overhead as low as possible, e.g., by involving only selected UEs which are highly relevant and/or avoiding redundancy of having multiple UEs measure and report the same thing in the same location or condition, is highly desirable.

This is the main motivation as well as the focus of this invention. The invention therefore is focusing on the following 2 main questions:
 1. How the serving network initiates an on-the-fly massive QoS monitoring session over a certain time period for a targeted service area involving only gNBs and UEs which are really relevant to the targeted service area. The targeted service area can be specific to a certain geo-location or a road of interest for example.
 2. How relevant UEs are coordinated to perform QoS monitoring, especially over SL, for the session so as to keep overhead down.

According to certain embodiments of the present invention, there is proposed a method to reduce overhead while facilitating a dynamic on-the-fly massive QoS monitoring of deliverable QoS level(s) on provided V2X application(s) or service(s) or QoS class(es) over a targeted service area crossing one or more cells of a serving network.

The proposed method according to certain embodiment of the present invention, as seen from the UE perspective for instance, can be summarized as follows.
 1. The UE receives, from a serving network, a request for an on-the-fly massive QoS monitoring session;
 2. The UE determines whether the UE is relevant to the request or not, based on contents of the request and/or how the request is received—whether the request is received in dedicated signaling or common signaling, as detailed further in Step 3;
 3. In case the outcome of the determining in Step 2 is positive:
    a. In case the UE receives the request in dedicated signaling, the UE is enforced with the positive outcome in Step 2 and therefore the UE initiates the on-the-fly massive QoS monitoring session over SL by broadcasting an announcement of the on-the-fly massive QoS monitoring session over SL;
    b. In case the UE receives the request in common signaling, the UE is configured to check the contents of the request for an indication of at least a targeted location or service area or a condition or a QoS profile that is applied for the UE for the positive outcome in Step 2. The UE then further determines whether to initiate the QoS monitoring session over SL by broadcasting an announcement of the on-the-fly massive QoS monitoring session over SL right away as in 3.a) or first to monitor announcements of the on-the-fly massive QoS monitoring session from other UEs in proximity over SL. This determining step is based on, e.g., the current state of the UE in the Uu operation whether UE is in CONNECTED/ACTIVE or not (IDLE/INACTIVE); and/or the current role of the UE in the SL operation—whether the UE is acting as a synchronization source for SL or not; and/or whether the UE is currently using the service of which QoS profile is the same as that indicated in the request received in Step 1 for QoS monitoring or not. The positive outcome of at least one of these conditions may enforce the UE to initiate the QoS monitoring session over SL, as in Step 3.a). In case the UE determines to monitor announcements of the on-the-fly massive QoS monitoring session over SL first:
    i. If the UE receives more than a preconfigured number of the announcements of the same on-the-fly massive QoS monitoring session over SL from other UEs in proximity, the UE refrains from initiating the on-the-fly massive QoS monitoring session over SL;
    ii. Else the UE initiates the on-the-fly massive QoS monitoring session over SL as in Step 3.a).
 4. In case the outcome of the determining in Step 2 is negative, the UE ignores the request.

Figure 1:
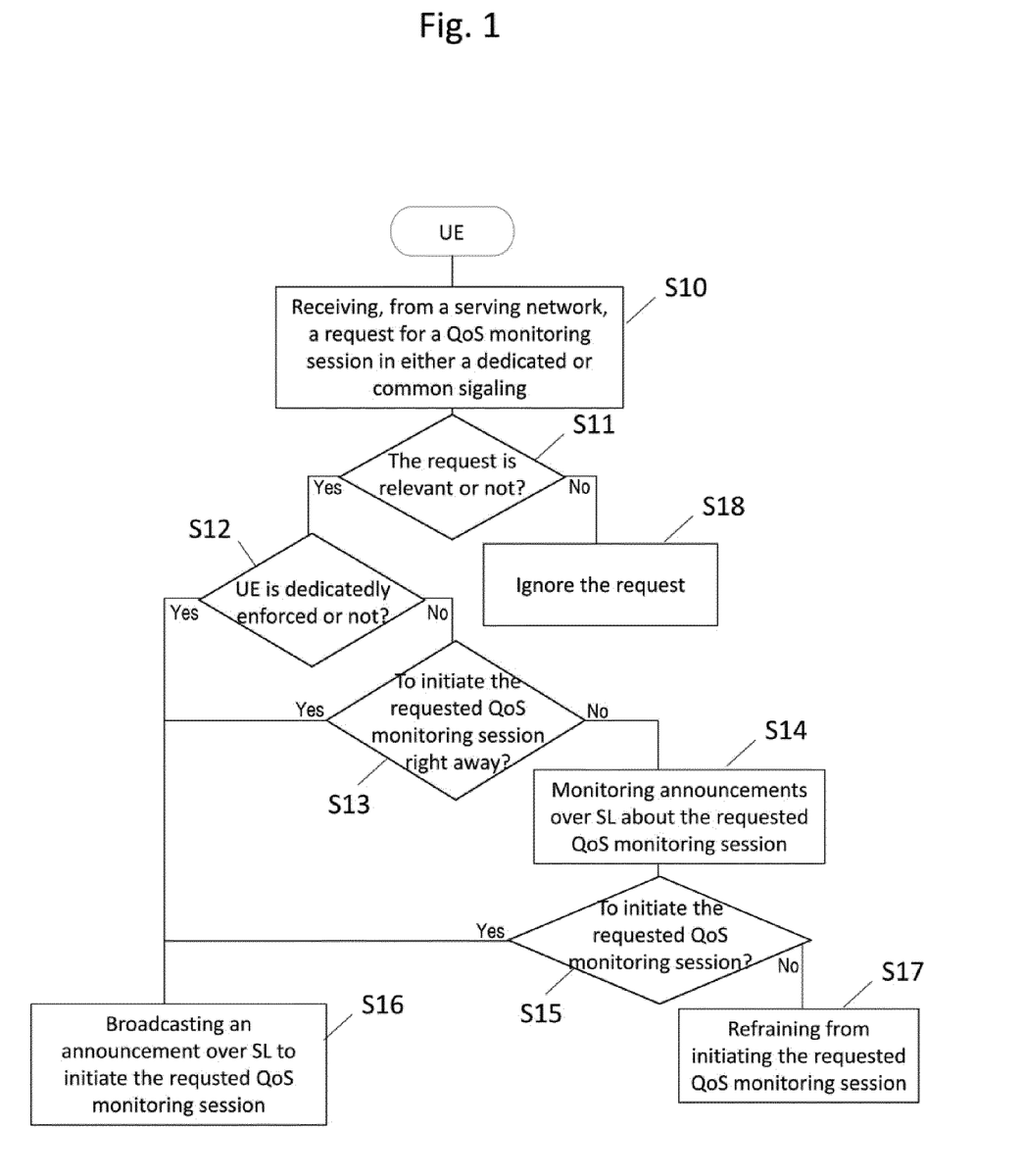
FIG. 1 is flowchart showing an example of a UE operation according to certain embodiments of the present invention.

FIG. 1 provides a block diagram to illustrate the above UE operation in more detail.

First, in step S10, the UE receives, from a serving network, a request for a QoS monitoring session in either a dedicated or common signaling.

In step S11, it is determined whether or not the UE is relevant for the request. Such a determination is based on contents of the received request in S10 (see also S21 to S26 in FIG. 2 which is described later) and relevant contexts of UE (such as its location and capability in performing the requested QoS monitoring). For examples, the UE considers itself relevant, if the UE is currently in the targeted service area, as indicated in the request, and capable of performing the requested QoS monitoring, e.g., of certain KPI or QoS characteristics of a particular service, service class or QoS profile.

If it is determined in step S11 that the UE is relevant, the process proceeds to step S12. Otherwise, if it is determined in step S11 that the UE is not relevant to the request, the process proceeds to step S18, where the request is ignored.

In step S12, it is determined whether the UE has received the request in dedicated signaling or common signaling. If it is determined in step S12 that the UE has received the request in dedicated signaling (Yes in step S12), the process proceeds to step S16. In step S16, the UE broadcasts an announcement over SL to initiate the requested QoS monitoring session and thereby initiates the QoS monitoring session over SL. The announcement includes at least some configured information of the requested QoS monitoring session which is based on the request received from the serving network. The contents of the request are detailed below for example.

Otherwise, if it is determined in step S12 that the UE has received the request in common signaling (No in step S12), the process proceeds to step S13.

In step S13, the UE is configured to check the contents of the request for an indication of at least a targeted location or service area or a condition or a QoS profile that is applied for the UE for the positive outcome in step 12. The UE then further determines whether to initiate the QoS monitoring session over SL by broadcasting an announcement of the QoS monitoring session over SL right away or first to monitor announcements of the QoS monitoring session from other UEs in proximity over SL. As set out above, this determining step is based on, e.g., the current state of the UE in the Uu operation whether UE is in CONNECTED/ACTIVE or not (IDLE/INACTIVE); and/or the current role of the UE in the SL operation—whether the UE is acting as a synchronization source for SL or not; and/or whether the UE is currently using the service of which QoS profile is the same as that indicated in the request received in Step 10 for QoS monitoring or not. The positive outcome of at least one of these conditions may enforce the UE to initiate the QoS monitoring session over SL, as in Step 16. Thus, if the determination in step S13 is "Yes", the process proceeds further to step S16, where the UE broadcasts an announcement over SL to initiate the requested QoS monitoring session and thereby initiates the QoS monitoring session over SL, as set out above.

Otherwise, if the determination in step S13 is "No", the process proceeds to step S14 in which the UE determines to monitor announcements of the QoS monitoring session over SL first.

Then, in step S15, the UE determines whether or not to initiate the requested QoS monitoring session. If the UE receives more than a preconfigured number of the announcements of the same QoS monitoring session over SL from other UEs in proximity, the UE proceeds further to step S17, in which the UE refrains from initiating the QoS monitoring session over SL. Otherwise, the UE proceeds further to step S16, in which the UE initiates the QoS monitoring session over SL.

Certain embodiments of the present invention provide a multi-stage decision making method to help filter out irrelevant UEs and further reduce the number of relevant UEs that need to play the initiating role of QoS measurement and reporting individually for the massive QoS monitoring session. The initiating role here is associated with specified tasks such as initiating and performing connection setup over Uu or SL including necessary PDU session, QoS flows or RB services; originating and terminating test data; and performing QoS measurement and reporting at least in the case of QoS monitoring over SL. Thus, reducing the number of UEs playing the initiating roles means reducing overhead significantly.

Figure 2:
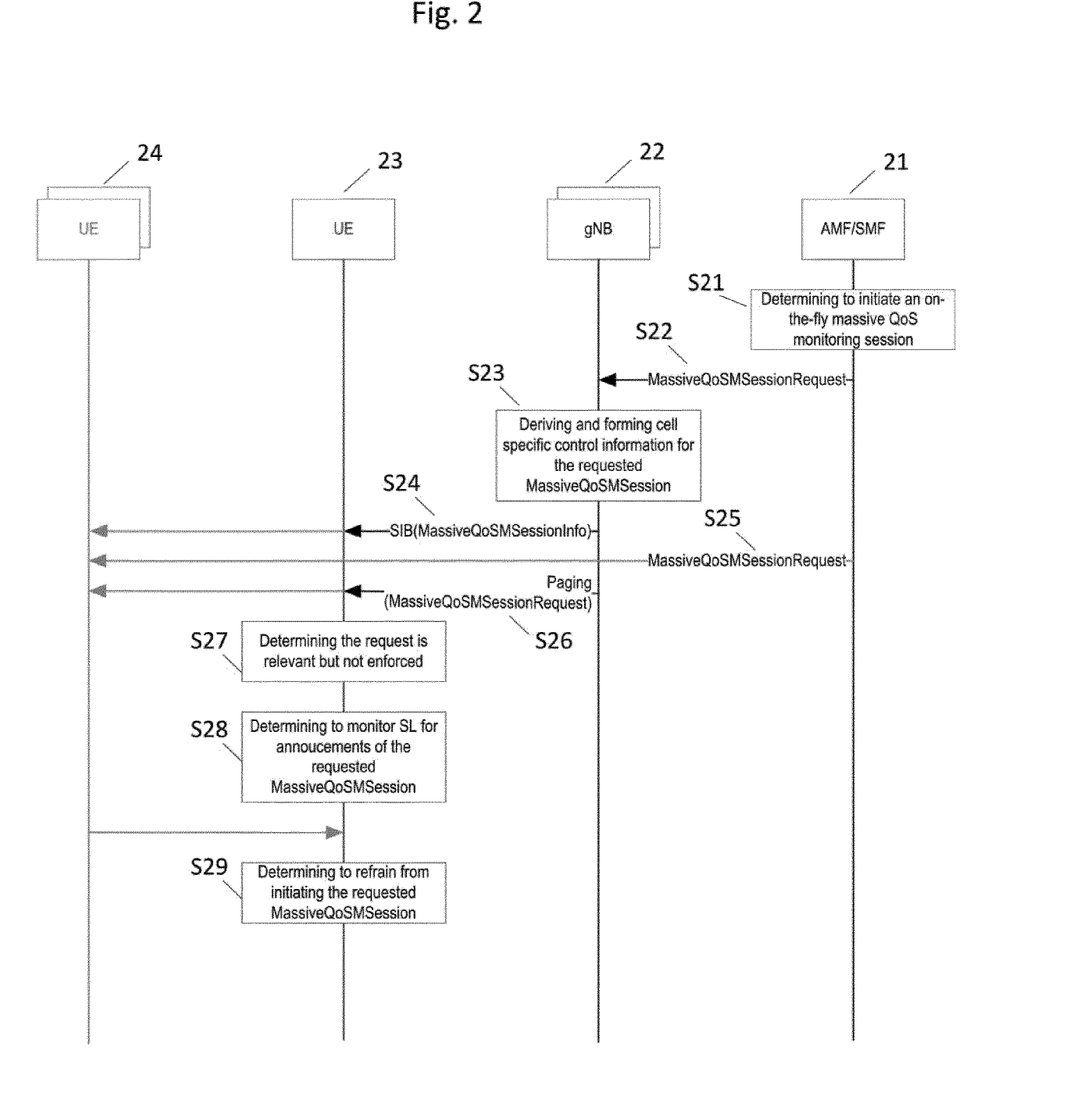
FIG. 2 is a signaling diagram showing signaling flows according to certain embodiments of the present invention.

FIG. 2 illustrate an example of signaling flows between a given UE 23 and serving network entities according to certain embodiments of the present invention.

In FIG. 2, it is referred to on-the-fly massive QoS monitoring, however, it is noted that this is merely an example and that the present invention is not limited thereto.

In particular, FIG. 2 shows signaling flows between the given UE 23, an AMF/SMF 21, a gNB 22 and other UEs 24.

The request for an on-the-fly massive QoS monitoring session over a targeted location or service area may be initiated by a network control entity such as SMF/AMF, triggered by needs/demands from the application control server which can be periodical or event-based. That is, the AMF/SMF 21 determines in step S21 to initiate an on-the-fly massive QoS monitoring session. The request is distributed to all relevant gNBs and relevant UEs in the targeted service area.

The following elements are proposed according to certain embodiments of the present invention:

The targeted location or service area indicated in the request may be provided by one of the following options or any combinations thereof for example:
  the location information of a reference point and a range or radius from the reference point for a circle-shape service area;
  the location information of more than one reference points and further dimensions for other predefined shape of the targeted service area;
  cell IDs and IDs of the locally or geographically resolved service areas applied for SL resource allocation and reuse, as resolved per a relevant cell covering the targeted service area;
  cell IDs or IDs of deployed network devices or physical network entities such as small cells or RSUs deployed in the targeted service area per a relevant cell.

The request may first be distributed to all relevant gNBs in step S22 in a "MassiveQoSMSessionRequest" message so that individual gNBs may help redistribute the request to relevant UEs as per a relevant cell in an efficient manner. The request may indicate the assigned ID of the massive QoS monitoring session (unique and valid across all relevant gNBs) and the targeted service area as applied across the relevant gNBs. The request may further specify the requested QoS monitoring session including, e.g., a time period (consisting of a start and a stop time instant); an indication of the targeted V2X application(s) or service(s) or QoS class(es) corresponding to Uu and/or SL; and further QoS monitoring related measurement and reporting control information such as QoS characteristics to be monitored and reported, reference value ranges and deltas (thresholds) corresponding to configured QoS characteristics to trigger short/long reporting for examples. The short reporting may indicate e.g. a specified level of measured QoS corresponding to e.g. above adequate, adequate or below adequate range. The long reporting may indicate details of measured QoS characteristics. The relevant gNBs, based on the receive request, may derive and form/update cell-specific control information on massive QoS monitoring in general, relevant to the requested massive QoS monitoring session (S23). This can be provided in a SIB to relevant UEs the individual gNBs are serving (S24) for examples. This allows for shortening the request towards UEs, for examples, with only IDs of corresponding information elements such as the assigned ID of the requested QoS monitoring session and the ID(s) of QoS profile(s) to be monitored for the requested QoS monitoring session.

Further, as indicated above, the request is also distributed to relevant UEs in the targeted service area. In step S25, an example of the serving network using dedicated signaling to request at least one of UE 24 is provided. Further, in step S26, the request is forwarded from the gNB to the given UE 23 in a paging message for an example of using common signaling.

In step S27, it is determined, for example, that the request is relevant but not enforced due to common signaling, i.e. the UE 23 determines "Yes" in step S11 and "No" in step S12 in FIG. 1. This is done in the same manner as described above with respect to step S11 in FIG. 1. Then, in the example in FIG. 2, in step S28, the UE 23 determines to monitor SL for announcements of the requested MassiveQoSMSession and determines to refrain from initiating the requested MassiveQoSMSession in step S29, as UE 23 received a number of announcements of the requested MassiveQoSMSession from a number of UE 24.

The network control entity (AMF/SMF) as well as the relevant gNBs, considering whether the V2X application(s) or service(s) or QoS class(es) of interest are provided over Uu or SL or both Uu and SL, may determine and use either dedicated signaling or common signaling or both to initiate the on-the-fly massive QoS monitoring session towards relevant UEs. The dedicated signaling is preferable for the case the service(s) are provided over Uu, meaning that all relevant UEs are in an active or connected state. The common signaling is preferable otherwise, given that UEs in an inactive or idle state may be able to communicate over SL. The common signaling option may be initiated using a paging message to relevant UEs, either in active/connected state or in inactive/idle state. It is noted that both of the options can be coupled with the cell-specific control information derived and formed by the individual relevant gNBs as proposed above to optimize signaling overhead. Thus, an individual UE upon receiving the request, coupled with the received cell-specific control information corresponding to the requested massive QoS monitoring session, may determine, in a first stage, whether the UE is really relevant to the targeted service area or not and therefore needs to get involved or not.

It is noted that V2X communications may involve UEs from different PLMNs. The common application control server or function may coordinate and initiate an on-the-fly massive QoS monitoring session across all involved PLMNs as well. In this case, the application control server may also select certain UEs to be requested for the QoS monitoring session.

Further to the description of Step 3.b) above, UEs which are relevant to the targeted service area, as determined in the above proposal for a first stage, are configured to coordinate over SL in order to determine, in a second stage, whether individual UEs may skip at least reporting or not.

The following options may be considered.
Individual UEs in an active/connected state or acting as a SL synchronization source may either initiate or announce individual QoS monitoring sessions over SL with a preconfigured range or Tx power, corresponding to either the QoS monitoring is over SL or over Uu. The initiation or announcement of individual QoS monitoring sessions indicates about the belonging on-the-fly massive QoS monitoring session, including, e.g., IDs of the session and serving cell.
Individual UEs in an inactive/idle state may first monitor announcements of individual QoS monitoring sessions over SL from other UEs in proximity to determine whether they need to initiate individual QoS monitoring sessions or not, e.g., not in case individual UEs received more than a preconfigured integer N of announcements in proximity.
Individual UEs, regardless of being in an active/connected or inactive/idle state, monitor announcements of individual QoS monitoring sessions over SL to determine whether they need to initiate individual QoS monitoring sessions or not, e.g., not in case individual UEs received more than a preconfigured integer M of announcements in proximity from UEs belonging to the same session and serving cell.
Individual UEs which initiate or announce individual QoS monitoring sessions need to perform the QoS monitoring, according to the received request of the belonging on-the-fly massive QoS monitoring session.

Furthermore, it is noted that the UE which has initiated the requested QoS monitoring session may move out of the targeted location or service area of the request during the ongoing QoS monitoring session and therefore become irrelevant to the targeted location or service area. In this condition, the UE may be allowed to stop the ongoing QoS monitoring session with or without a need of sending a notification to the serving network over Uu or other UEs in proximity over SL.

In the following, a more general description of example versions of the present invention is made with respect to FIGS. 3 and 4.

Figure 3:
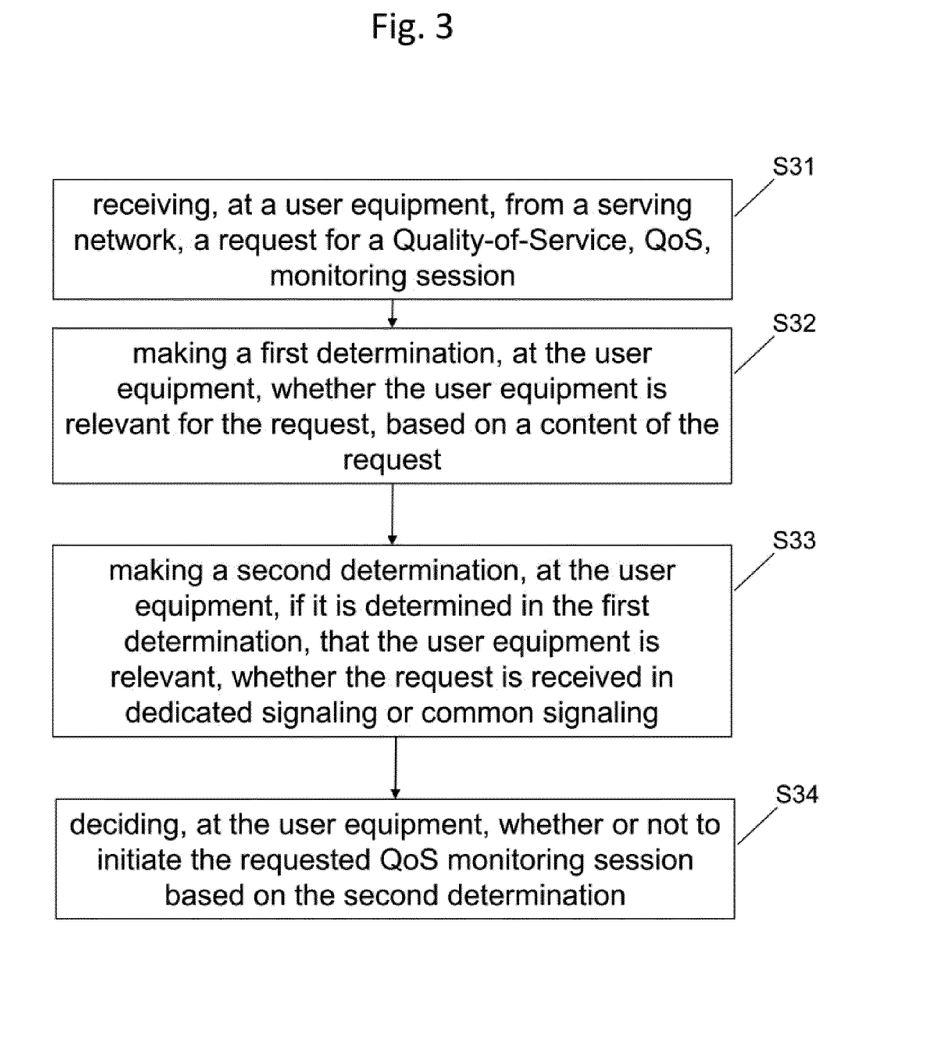
FIG. 3 is a flowchart illustrating an example of a method according to certain embodiments of the present invention.

FIG. 3 is a flowchart illustrating an example of a method according to some example versions of the present invention.

According to example versions of the present invention, the method may be implemented in or may be part of a user equipment, or the like. The method comprises receiving, in a step S31, at a user equipment, from a serving network, a request for a Quality-of-Service, QoS, monitoring session, making, in a step S32, a first determination, at the user equipment, whether the user equipment is relevant for the request, based on the content of the request, making, in a step S33, a second determination, at the user equipment, if it is determined in the first determination that the user equipment is relevant, whether the request is received in dedicated signaling or common signaling, deciding, in a step S34, at the user equipment, whether or not to initiate the requested QoS monitoring session based on the second determination.

According to some example versions of the present invention, the method further comprises, if it is determined in the second determination, that the request is received in dedicated signaling, deciding to initiate the requested QoS monitoring session by broadcasting an announcement of the requested QoS monitoring session over sidelink, SL.

According to some example versions of the present invention, the method further comprises making a third determination, if it is determined in the second determination, that the request is received in common signaling, whether or not to initiate the requested QoS monitoring session based on a content of the request.

According to some example versions of the present invention, the content of the request includes an indication of at least one of a targeted location or service area, a condition, and a QoS profile that is applied for the user equipment, and certain key performance indicators or QoS characteristics of a particular service, service class or QoS profile.

According to some example versions of the present invention, the condition of the user equipment used in the third determination includes at least one of a current state of the user equipment, the current role of the user equipment, and whether the user equipment is using the service for which the QoS monitoring is requested.

According to some example versions of the present invention, determining the current state of the user equipment includes determining whether the current state of the UE is connected/active or idle/inactive, and determining the current role of the user equipment includes determining whether the UE is acting as a synchronization source for SL or not.

According to some example versions of the present invention, the targeted location or the service area indicated in the request may be provided by one of the following options or any combinations thereof location information of a reference point and a range or radius from the reference point for a circle-shape service area;
location information of more than one reference points and further dimensions for other predefined shape of the targeted service area;
cell IDs and IDs of locally or geographically resolved service areas applied for SL resource allocation and reuse, as resolved per a relevant cell covering the targeted service area;
cell IDs or IDs of deployed network devices or physical network entities such as small cells or road side units deployed in the targeted service area per a relevant cell.

According to some example versions of the present invention, the method further comprises, if it is determined in the third determination not to initiate the requested QoS monitoring session, monitoring announcements about the requested QoS monitoring session from other user equipments over SL, making a fourth determination whether or not to initiate the requested QoS monitoring session based on the monitored announcements.

According to some example versions of the present invention, the method further comprises, if it is determined in the fourth determination that more than a preconfigured number of announcements of the requested QoS monitoring session is received from other user equipments, refraining from initiating the requested QoS monitoring session, and, if it is determined in the fourth determination that not more than a preconfigured number of announcements of the requested QoS monitoring session is received from other user equipments, initiating the requested QoS monitoring session by broadcasting an announcement of the requested QoS monitoring session over SL.

Figure 4:
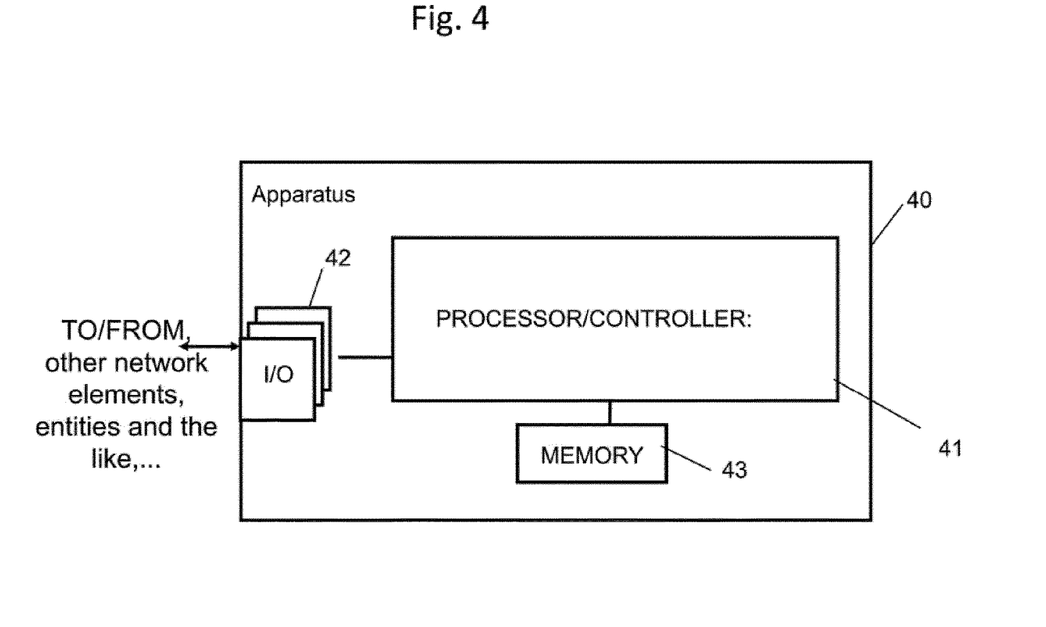
FIG. 4 is a block diagram illustrating an example of an apparatus according to certain embodiments of the present invention.

FIG. 4 is a block diagram illustrating an example of an apparatus according to some example versions of the present invention.

In FIG. 4, a block circuit diagram illustrating a configuration of an apparatus 40 is shown, which is configured to implement the above described various aspects of the invention. It is to be noted that the apparatus 40 shown in FIG. 4 may comprise several further elements or functions besides those described herein below, which are omitted herein for the sake of simplicity as they are not essential for understanding the invention. Furthermore, the apparatus may be also another device having a similar function, such as a chipset, a chip, a module etc., which can also be part of an apparatus or attached as a separate element to the apparatus, or the like.

The apparatus 40 may comprise a processing function or processor 41, such as a CPU or the like, which executes instructions given by programs or the like. The processor 41 may comprise one or more processing portions dedicated to specific processing as described below, or the processing may be run in a single processor. Portions for executing such specific processing may be also provided as discrete elements or within one or further processors or processing portions, such as in one physical processor like a CPU or in several physical entities, for example. Reference sign 42 denotes transceiver or input/output (I/O) units (interfaces) connected to the processor 41. The I/O units 42 may be used for communicating with one or more other network elements, entities, terminals or the like. The I/O units 42 may be a combined unit comprising communication equipment towards several network elements, or may comprise a distributed structure with a plurality of different interfaces for different network elements. The apparatus 40 further comprises at least one memory 43 usable, for example, for storing data and programs to be executed by the processor 41 and/or as a working storage of the processor 41.

The processor 41 is configured to execute processing related to the above-described aspects.

In particular, the apparatus 40 may be implemented in or may be part of a user equipment or the like, and may be configured to perform processing as described in connection with FIG. 3.

Further, the present invention may be implement by an apparatus comprising means for performing the above-described processing.

For further details regarding the functions of the apparatus, reference is made to the description of the methods according to some example versions of the present invention as described in connection with FIGS. 1 to 3.

In the foregoing exemplary description of the apparatus, only the units/means that are relevant for understanding the principles of the invention have been described using functional blocks. The apparatus may comprise further units/means that are necessary for its respective operation, respectively. However, a description of these units/means is omitted in this specification. The arrangement of the functional blocks of the apparatus is not to be construed to limit the invention, and the functions may be performed by one block or further split into sub-blocks.

When in the foregoing description it is stated that the apparatus (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is to be construed to be equivalent to an expression such as "means for").

For the purpose of the present invention as described herein above, it should be noted that method steps likely to be implemented as software code portions and being run using a processor at an apparatus (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the aspects/embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the aspects/embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components, APU (Accelerated Processor Unit), GPU (Graphics Processor Unit) or DSP (Digital Signal Processor) components;

devices, units or means (e.g. the above-defined apparatuses, or any one of their respective units/means) can be implemented as individual devices, units or means, but this does not exclude that they are implemented in a distributed fashion throughout the system, as long as the functionality of the device, unit or means is preserved;

an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described embodiments can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

It is to be noted that the aspects/embodiments and general and specific examples described above are provided for illustrative purposes only and are in no way intended that the present invention is restricted thereto. Rather, it is the intention that all variations and modifications which fall within the scope of the appended claims are covered.

Embodiments of the invention are described for 5G networks. However, the invention is not restricted to 5G networks and may be employed in other 3GPP networks such as 3G networks, 4G networks, and upcoming 3GPP releases, too. The invention may be employed in non-3GPP networks provided they comprise a corresponding function.

One piece of information may be transmitted in one or plural messages from one entity to another entity. Each of these messages may comprise further (different) pieces of information.

Names of network elements, protocols, and methods are based on current standards. In other versions or other technologies, the names of these network elements and/or protocols and/or methods may be different, as long as they provide a corresponding functionality.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be embodied in the cloud.

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof.

It is to be understood that what is described above is what is presently considered the preferred embodiments of the present invention. However, it should be noted that the description of the preferred embodiments is given by way of example only and that various modifications may be made without departing from the scope of the invention as defined by the appended claims.

The invention claimed is:

1. A method, comprising:
receiving, at a user equipment, from a serving network, a request for a Quality-of-Service, QoS, monitoring session;
making a first determination, at the user equipment, whether the user equipment is relevant for the request, based on a content of the request,
wherein the content of the request includes an indication of at least one of a targeted location or service area, a condition, and a QoS profile that is applied for the user equipment, and certain key performance indicators or QoS characteristics of a particular service, service class or QoS profile,
making a second determination, at the user equipment, if it is determined in the first determination that the user equipment is relevant, whether the request is received in dedicated signaling or common signaling, and
deciding, at the user equipment, whether or not to initiate the requested QoS monitoring session based on the second determination.

2. The method according to claim 1, further comprising if it is determined in the second determination, that the request is received in dedicated signaling, deciding to initiate the requested QoS monitoring session by broadcasting an announcement of the requested QoS monitoring session over side link, SL.

3. The method according to claim 1, further comprising:
making a third determination, if it is determined in the second determination, that the request is received in common signaling, whether or not to initiate the requested QoS monitoring session based on the content of the request.

4. The method according to claim 3, wherein the third determination whether or not to initiate the requested QoS monitoring session is additionally based on a current state of the user equipment, a current role of the user equipment, and whether the user equipment is using a service for which the QoS monitoring is requested.

5. The method according to claim 4, wherein
determining the current state of the user equipment includes determining whether the current state of the user equipment is connected/active or idle/inactive;
determining the current role of the user equipment includes determining whether the user equipment is acting as a synchronization source for SL or not.

6. The method according to claim 3, further comprising:
if it is determined in the third determination not to initiate the requested QoS monitoring session, monitoring announcements about the requested QoS monitoring session from other user equipment over SL, making a fourth determination whether or not to initiate the requested QoS monitoring session based on the monitored announcements.

7. The method according to claim 6, further comprising:
if it is determined in the fourth determination that more than a preconfigured number of announcements of the requested QoS monitoring session is received from other user equipment, refraining from initiating the requested QoS monitoring session, and
if it is determined in the fourth determination that not more than a preconfigured number of announcements of the requested QoS monitoring session is received from other user equipment, initiating the requested QoS monitoring session by broadcasting an announcement of the requested QoS monitoring session over SL.

8. The method according to claim 1, wherein
the targeted location or the service area indicated in the request may be provided by one or more of:
location information of a reference point and a range or radius from the reference point for a circle-shape service area;
location information of more than one reference points and further dimensions for other predefined shape of the targeted service area;
cell IDs and IDs of locally or geographically resolved service areas applied for SL resource allocation and reuse, as resolved per a relevant cell covering the targeted service area; and
cell IDs or IDs of deployed network devices or physical network entities such as small cells or road side units deployed in the targeted service area per a relevant cell.

9. An apparatus, comprising
at least one processor, and
at least one memory for storing instructions to be executed by the processor, wherein
the at least one memory and the instructions are configured to, with the at least one processor, cause the apparatus at least to perform:
receiving, at a user equipment, from a serving network, a request for a Quality-of-Service, QoS, monitoring session;
making a first determination, at the user equipment, whether the user equipment is relevant for the request, based on a content of the request,
making a second determination, at the user equipment, if it is determined in the first determination that the user equipment is relevant, whether the request is received in dedicated signaling or common signaling,
wherein if it is determined in the second determination, that the request is received in dedicated signaling, deciding to initiate the requested QoS monitoring session by broadcasting an announcement of the requested QoS monitoring session over side link, SL, and
deciding, at the user equipment, whether or not to initiate the requested QoS monitoring session based on the second determination.

10. The apparatus according to claim 9, wherein the at least one memory and the instructions are further configured to, with the at least one processor, cause the apparatus at least to perform:
making a third determination, if it is determined in the second determination, that the request is received in common signaling, whether or not to initiate the requested QoS monitoring session based on the content of the request.

11. The apparatus according to claim 10, wherein the third determination whether or not to initiate the requested QoS monitoring session is additionally based on a current state of the user equipment, a current role of the user equipment, and whether the user equipment is using a service for which the QoS monitoring is requested.

12. The apparatus according to claim 11, wherein
determining the current state of the user equipment includes determining whether the current state of the user equipment is connected/active or idle/inactive;
determining the current role of the user equipment includes determining whether the user equipment is acting as a synchronization source for SL or not.

13. The apparatus according to claim 9, wherein
the content of the request includes an indication of at least one of a targeted location or service area, a condition, and a QoS profile that is applied for the user equipment, and certain key performance indicators or QoS characteristics of a particular service, service class or QoS profile.

14. The apparatus according to claim 13, wherein
the targeted location or the service area indicated in the request may be provided by one or more of:
location information of a reference point and a range or radius from the reference point for a circle-shape service area;
location information of more than one reference points and further dimensions for other predefined shape of the targeted service area;
cell IDs and IDs of locally or geographically resolved service areas applied for SL resource allocation and reuse, as resolved per a relevant cell covering the targeted service area; and
cell IDs or IDs of deployed network devices or physical network entities such as small cells or road side units deployed in the targeted service area per a relevant cell.

15. The apparatus according to claim 10, wherein the at least one memory and the instructions are further configured to, with the at least one processor, cause the apparatus at least to perform:
if it is determined in the third determination not to initiate the requested QoS monitoring session, monitoring announcements about the requested QoS monitoring session from other user equipment over SL,
making a fourth determination whether or not to initiate the requested QoS monitoring session based on the monitored announcements.

16. The apparatus according to claim 15, wherein the at least one memory and the instructions are further configured to, with the at least one processor, cause the apparatus at least to perform:
if it is determined in the fourth determination that more than a preconfigured number of announcements of the requested QoS monitoring session is received from other user equipments, refraining from initiating the requested QoS monitoring session, and
if it is determined in the fourth determination that not more than a preconfigured number of announcements of the requested QoS monitoring session is received from other user equipments, initiating the requested QoS monitoring session by broadcasting an announcement of the requested QoS monitoring session over SL.

17. An apparatus, comprising
means for receiving, at a user equipment, from a serving network, a request for a Quality-of-Service, QoS, monitoring session;
means for making a first determination, at the user equipment, whether the user equipment is relevant for the request, based on a content of the request, means for making a second determination, at the user equipment, if it is determined in the first determination that the user equipment is relevant, whether the request is received in dedicated signaling or common signaling, means for making a third determination, at the user equipment, if it is determined in the second determination, that the request is received in common signaling, whether or not to initiate the requested QoS monitoring session based on the content of the request, wherein the third determination whether or not to initiate the requested QoS monitoring session is additionally based on a current state of the user equipment, a current role of the user equipment, and whether the user equipment is using a service for which the QoS monitoring is requested, and means for deciding, at the user equipment, whether or not to initiate the requested QoS monitoring session based on the second determination.

18. A computer program comprising instructions for causing an apparatus to perform the method according to claim 1.

19. A computer readable medium storing a computer program according to claim 18.

* * * * *